Oct. 21, 1941.  C. D. HOWARD  2,259,976
WELDING APPARATUS
Filed July 7, 1938  4 Sheets-Sheet 3
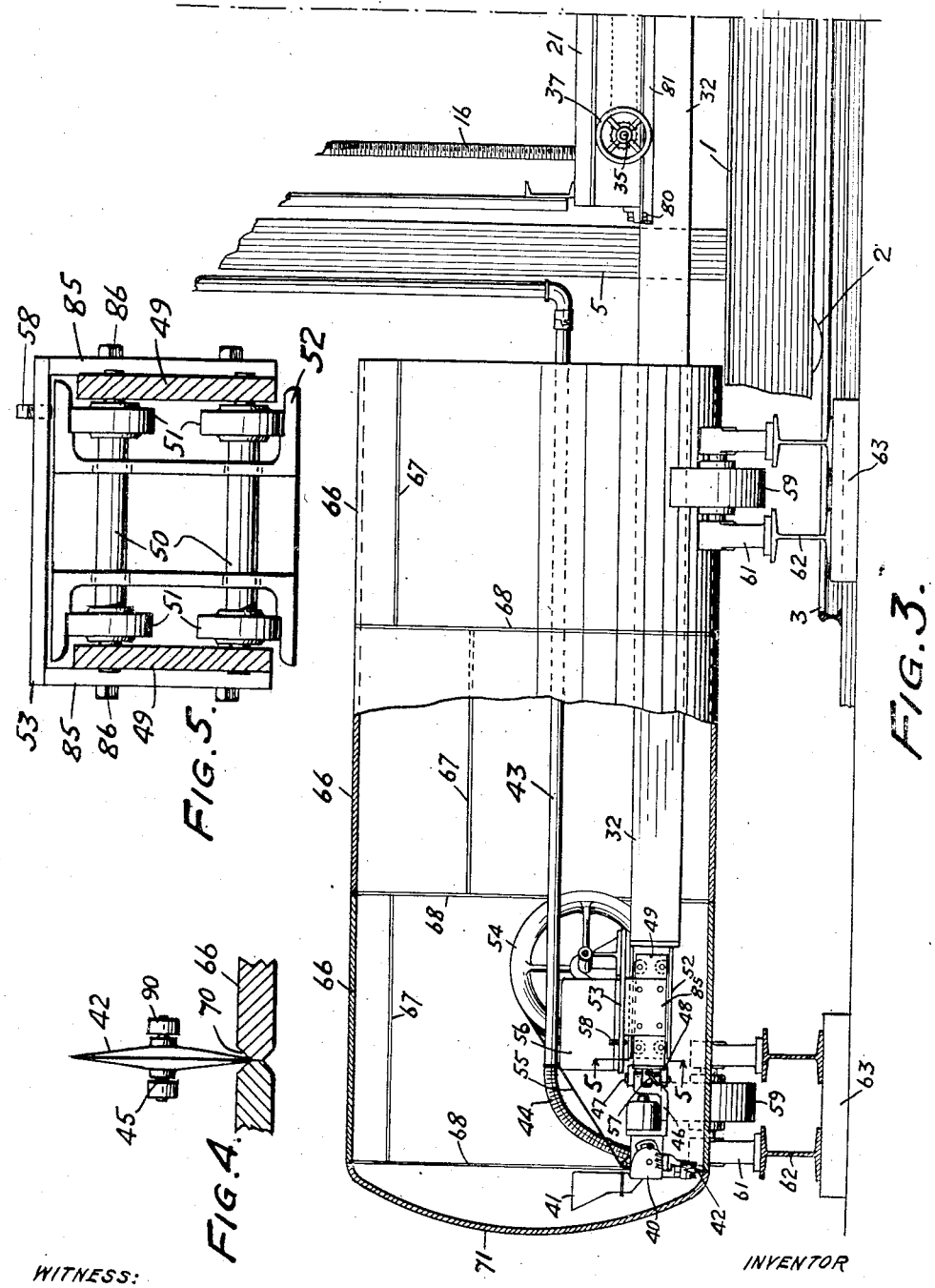
INVENTOR
Cecil D. Howard
BY
ATTORNEYS Oct. 21, 1941.  C. D. HOWARD  2,259,976
WELDING APPARATUS
Filed July 7, 1938  4 Sheets-Sheet 4

WITNESS:
Rob R Kitchel

INVENTOR
Cecil D. Howard
BY
Burns T Harding
ATTORNEYS.

Patented Oct. 21, 1941

2,259,976

UNITED STATES PATENT OFFICE 2,259,976

WELDING APPARATUS

Cecil D. Howard, Swarthmore, Pa., assignor to Sun Shipbuilding & Dry Dock Company, Chester, Pa., a corporation of Pennsylvania Application July 7, 1938, Serial No. 217,883

16 Claims. (Cl. 219—8)

This invention relates to an improvement in welding apparatus and more particularly to apparatus for welding in the construction of tanks, pressure vessels, and the like.

Heretofore in the construction of tanks, pressure vessels, and the like, it has been customary to form a series of rings, weld them together and then to weld on a head or heads.

In the prior practice the rings were formed from suitable material by bending and then supported successively on rollers, permitting them to be rotated, were welded internally and externally along their longitudinal and girth seams. The external welding has heretofore been accomplished mechanically. However, heretofore the welding of the longitudinal and girth seams internally has only been accomplished by hand welding.

Now it is the object of this invention to provide means whereby in the construction of tanks, pressure vessels, and the like, the internal welding of the longitudinal and girth seams may be accomplished mechanically, and, more particularly, to provide means for such purpose which will be readily combined with existing means for welding the longitudinal and girth seams externally.

Having now indicated in a general way the nature and purpose of this invention, I will now proceed to a detailed description of a preferred embodiment thereof with reference to the accompanying drawings in which:

Figure 3 is a side view, partly in section and partly broken away, of a portion of the apparatus shown in Figure 1, in position for internal welding of a girth seam.

Figure 4 is a view showing a detail of construction.

Figure 5 is a sectional view on line 5—5, Figure 3.

Figure 6 is a partial view of a ring for construction of a tank.

Figure 1:
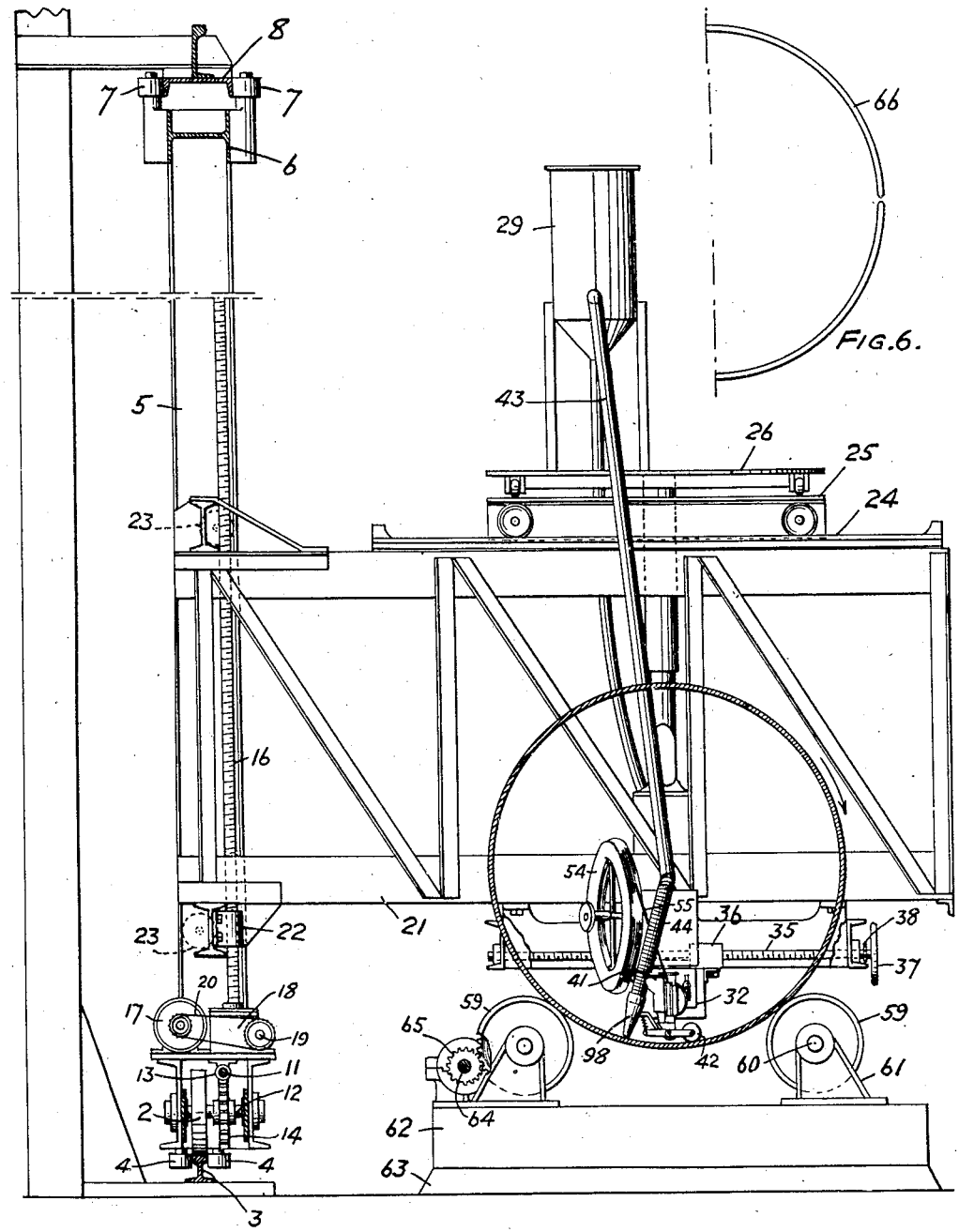
Figure 1 is a front view, partly in section, showing a preferred embodiment of this invention in position for internally welding a girth seam in the construction of a tank.

Referring to the several figures, I indicates a carriage, supported on wheels 2, mounted on axles 12, adapted to travel on a rail 3 on the ground. Rollers 4, supported from the carriage, bear against opposite sides of the rail and maintain the wheels 2 in alignment thereon. Extending vertically from the carriage are a pair of members 5, of H section, and connected at their upper ends by a member 6. The member 6 serves to support rollers 7, which bear against opposite sides of a rail 8 supported above rail 3 and serve to maintain the carriage upright on rail 3.

The carriage 1 is adapted to be driven by an electric motor 9, mounted on a bracket 15 on the carriage 1 and connected through a clutch and reduction gearing 10 to a shaft 11 carrying a worm 13 arranged to drive a worm wheel or gear 14 mounted on the axles 12.

Supported on the carriage 1 and extending vertically between the members 5 are a pair of screws 16, adapted to be driven by an electric motor 17, mounted on the carriage, through gearing 18 and shaft 19 driven by the motor through a chain 20.

A cage 21 is mounted on the screws 16 by means of nuts 22 and is provided with guide rollers 23 arranged to bear oppositely within the members 5 in order to support the cage in a horizontal position extending laterally of the carriage as shown in Figure 1.

It will now be observed that the carriage 1, supporting the cage 21, mounted on screws 16, will, in operation of the motor 9, be driven longitudinally on the rail 3 and will be maintained upright by the engagement of rollers 7 with rail 8. At the same time the cage may be elevated and positioned vertically with respect to the carriage by the operation of motor 17, which will drive the screws 16 on which the cage 21 is mounted, through nuts 22.

The rail 3 may be of any desired length and will be of a length sufficient so that the carriage can travel longitudinally of and beyond the ends of tanks or pressure vessels to be constructed, and the members 5 and the screws 16 will be of a height such that the bottom of the cage 21 may be elevated to clear tanks or pressure vessels to be constructed.

Mounted on top of the cage 21 on rails 24, extending longitudinally of the cage, is a trolley 25 on which in turn is mounted a turntable 26. From the center of the turntable, and turnable therewith, a post 27 depends and serves to support from its lower end a welding head 28.

The welding head 28 may be of any suitable type adapted for electric welding and may be secured to the post 27 in any suitable or desired manner to turn therewith. The welding head will be so positioned as to be adaptable for the performance of the welding operation at a point beneath the cage 21.

Mounted on the turntable 26 are the various supplies necessary to the welder, as a flux supply bin 29, a reel of welding wire 30 and a motor driven suction fan 31, connected to the flux supply bin for the return of excess flux from the weld.

It will now be noted that the welding head 28 can be adjusted vertically by adjustment of the cage 21 on the screws 16, is moved longitudinally when the carriage 1 is driven and can be turned through 180° for welding in opposite directions of travel of the carriage 1, since it is mounted on the turntable 26, which in turn is mounted on the trolley 25, which is movable longitudinally of the cage 21 for lateral adjustment of the welder. Here it will be noted that the supplies for the welder, as flux and welding wire, and the suction fan for the return of excess flux are all mounted on the turntable 26, from which the welding head is supported so that when the welding head is turned for reverse operation the relative position of the supplies to the welding head remains unchanged.

Removably mounted beneath the cage 21 is an arm 32 which extends laterally of the cage in parallelism with the rail upon which the carriage 1 travels.

Figure 2:
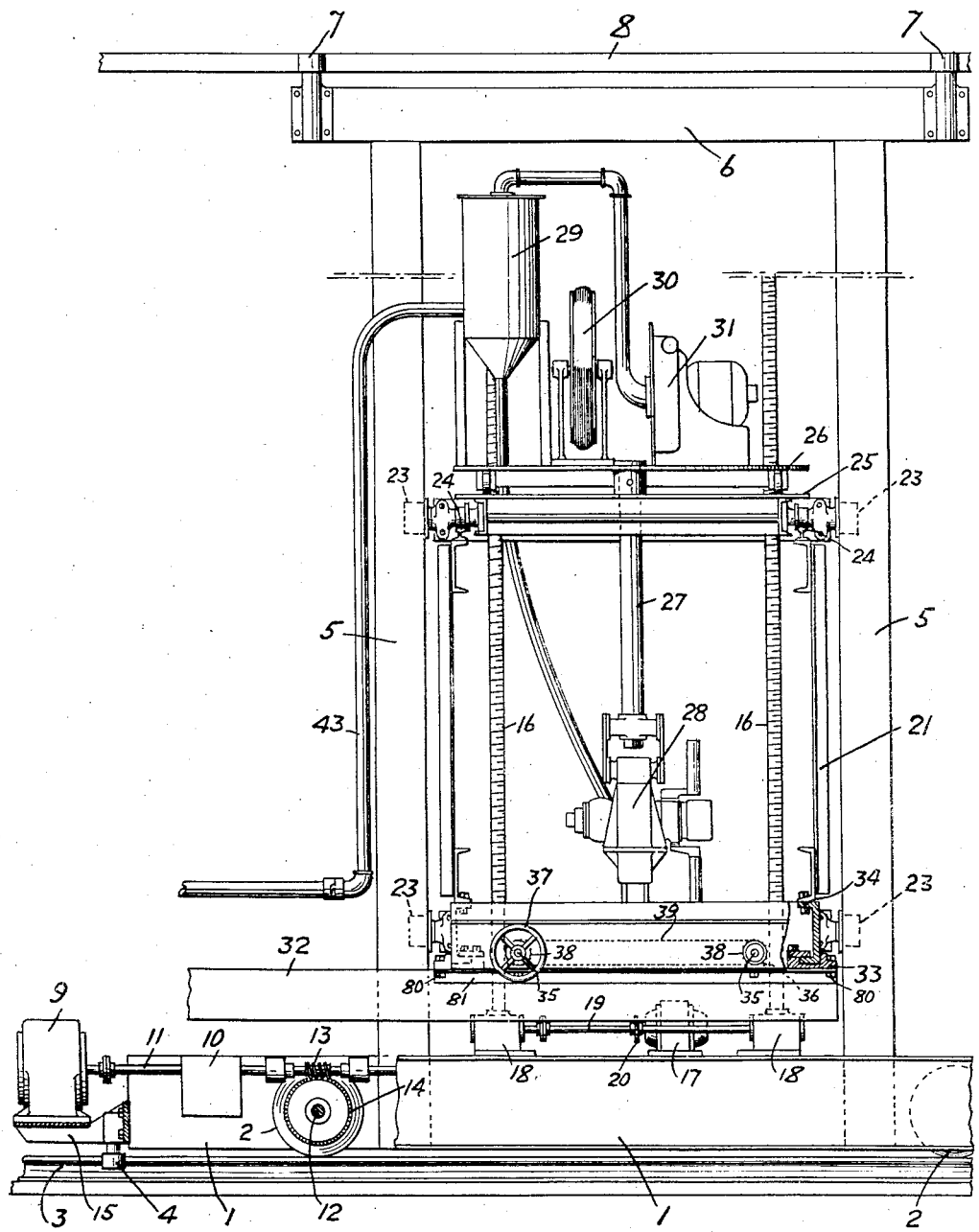
Figure 2 is a side view, partly broken away, of a portion of the apparatus taken at right angles to Figure 1.
Figure 7:
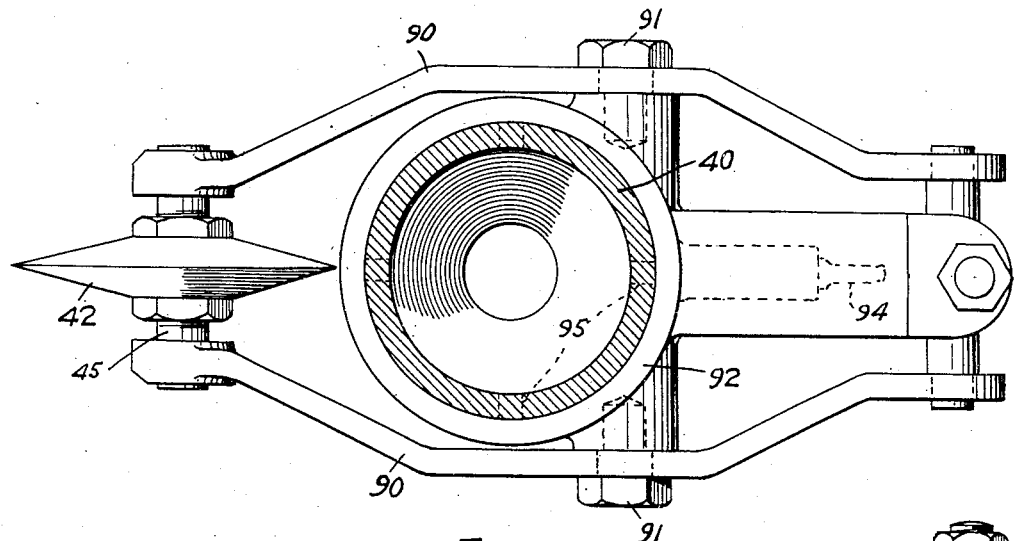
Figures 7 and 8 are sectional views showing a detail of construction.
Figure 8:
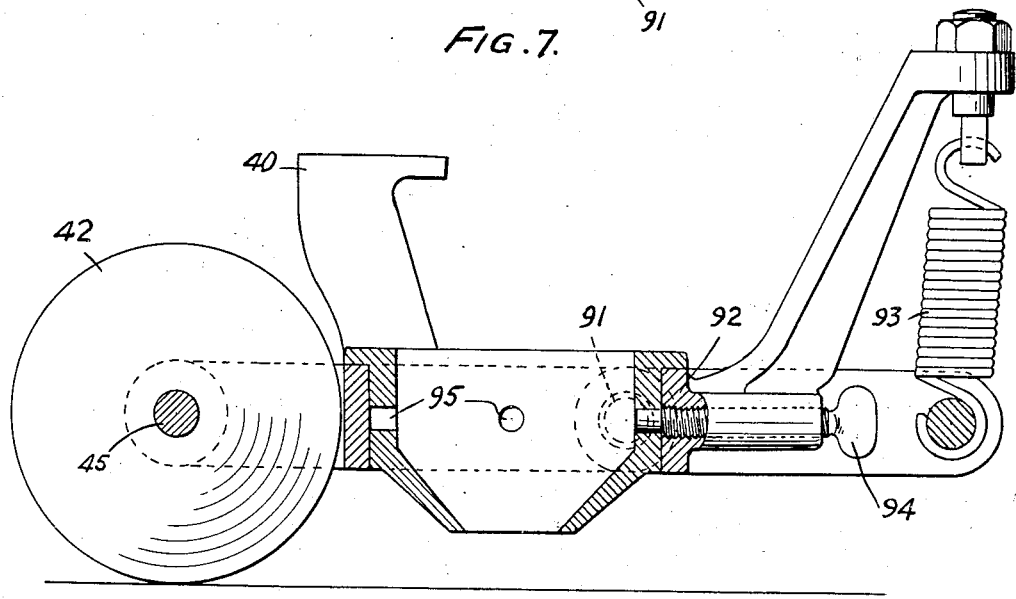

The arm 32 is secured by bolts 80, to members 81 connecting a pair of slides 33 secured to the cage 21 by means of bolted flanges 34, as shown in Figure 2, adapting them to slide longitudinally of the cage. The members 81 connecting the slides 33 are respectively connected to a pair of nuts 36 engaging a pair of screws 35. One of the screws 35 is provided with a hand wheel 37 and is connected with the other through sprockets 38 and chain 39. Hence, the arm may be adjusted transversely of its direction of extension by rotation of the screws 35 by means of the hand wheel 37, thus moving the members 81 to which the arm is secured longitudinally of the cage 21.

On the free end of the arm, remote from the cage 21, is mounted an electric welding head 40 provided with a hopper 41, for the supply of flux and with a guide wheel 42 bevelled to a narrow edge. A conduit 43 leads from the flux supply hopper 29, provided at its end with a flexible section 44 having at its end a nozzle 98 for the return of excess flux. The guide wheel 42 is mounted on trunnions 45 engaging a bracket 90 secured from pivots 91 to a member 92 mounted on the lower end of the welding head and turnable through 360°. A spring 93 is connected to the rear of the bracket 90 and to the member 92 and a set of screws 94 passes through the bracket and is adapted to enter any one of four openings 95 in the member 92 to secure the guide wheel in position on any quadrant.

The welding head 40 is mounted on the arm 32 by means of bracket 46 secured to the welding head and connected by a vertical pivot 47 to bracket 48 on the forward end of a carriage 49. The carriage 49 carries shafts 50 upon which are mounted rollers 51 which engage the upper and lower flanges of a pair of oppositely facing channel members 52 which are secured to and extend beyond the free end of arm 32, as shown in Figure 5. Above the carriage 49 is a platform 53, having depending members 85 secured to the carriage by bolts 86. The platform 53 serves to support a reel 54 for the welding wire 55, and the electric control panel 56, on which are mounted controls for the carriage 1, the cage 21 and the welder 40.

A set screw 57 is provided for locking the welding head against movement about the vertical pivot 47 and a lock screw 58 is provided for locking the carriage 49.

Spaced laterally from the rail 3 upon which carriage 1 travels is a bed of laterally and longitudinally spaced rollers 59, mounted on shafts 60 extending in parallelism with rail 3 and journaled in brackets 61, which in turn are supported from I-beams 62 resting on foundations 63. The rollers 59 along one side of the bed are adapted to be driven from a shaft 64, connected to an electric motor (not shown) through gearing 65.

The rollers 59 are spaced laterally and longitudinally for the support of rings 66 to be welded internally and externally by the longitudinal seams 67, on the girth seams 68 and the girth seams on which the head 71 is welded on, the abutting edges of which are bevelled to form a groove for the reception of the welding wire, as shown at 70, Figure 4.

In the operation of the apparatus above described a preformed ring 66 is placed upon the bed of rollers 59 with the longitudinal seam at its top. The arm 32 is removed from the cage 21 and the cage is elevated and the carriage 1 driven to bring the welding head 28 in operative relation with one end of the longitudinal seam 67 of the ring. The carriage 1 is then driven at a suitable speed and in a suitable direction to cause the welding head 28 to traverse the seam and effect an external weld. A second ring 66 is then placed on the bed of rollers in abutting relation with the first ring and its longitudinal seam 67 welded by further movement of the carriage 1. The carriage 1 and cage 21 are then adjusted to position the welding head 28 in operative relation with the girth seam 68 and the rings are rotated, by driving the rollers 59, to cause the girth seam to be traversed by the welding head for its welding externally.

When the longitudinal seam of one ring has been welded externally or, preferably, when two or more rings have been welded externally on their longitudinal and girth seams, as described above, the carriage 1 is moved to position the cage 21 away from the rings and arm 32 is secured to the cage 21. The carriage 1 is then moved to enter the arm 32 within the rings and the cage 21 is adjusted on screws 16 to position the welding head 40 in operative relation with the inside of a girth seam 68, which may be the seam on which the head 71 of a tank is welded, as shown in Figure 3. When the welding head 40 is adjusted for welding a girth seam, the set screw 57 will be set to lock the pivot 47, while the set screw 58 will be loosened to free the carriage 49 and the guide wheel 42 will be lined in the groove formed by the bevelled edges 70 of the seam and in which it will be held by the spring 93.

When the welding head 40 is adjusted the rings will be rotated at a suitable speed to cause the girth seams to traverse the welding head for the internal welding of the seams, it being noted that the welding head will be maintained in accurate alignment with the seams by the guide wheel 42, which will be adjusted in advance of the welder with respect to the direction of rotation of the rings and which, tracking in the groove formed by the bevelled edges of the rings, will cause the carriage 49 to move longitudinally of the arm as the girth seams may vary in direction.

The longitudinal seams 67 of the rings are internally welded by rotation of the ring or rings to bring the seam to be welded at the bottom of the ring and adjustment of the carriage 1 and cage 21 to bring the welding head 40 into operative relation with one end of the seam. Any final adjustment of the welding head with respect to a longitudinal seam may be made by a lateral adjustment of arm 32 effected by manipulation of hand wheel 37. In the adjustment of the welding head 40 for internally welding a longitudinal seam, the carriage 49 is locked by turning up set screw 58 and the set screw 57 is loosened to free the vertical pivot 47. The welding of the seam will then be accomplished by moving the carriage 1 to cause the welder to traverse the seam and it will be noted that with the vertical pivot 47 free, the guide wheel 42 tracking in the groove ahead of the welder will cause the welder to move laterally on the pivot 47 as may be necessary for it to follow the seam.

In the welding of longitudinal or of girth seams, the welder or the rings may be moved in either direction, since the guide wheel 42 is adjustable to position it to lead the welder.

It will be appreciated that it is not contemplated that this invention shall be in any wise limited by the above detailed description of a preferred embodiment, since it will be obvious to those skilled in the art that various modifications in detail may be made without departing from the scope of the invention as defined in the appended claims.

What I claim and desire to protect by Letters Patent is:

1. A welding apparatus comprising, in combination, a rail, a carriage on said rail, a guide rail, means on the carriage engaging the guide rail, means for moving the carriage longitudinally of the rail, a pair of screws extending vertically from the carriage, a cage extending laterally of the carriage, nuts secured to the carriage and engaging said screws, means for rotating said screws, vertical guides for the cage, an arm secured at one end to the cage and extending laterally thereof in parallelism with said rail and a welding head mounted on said arm adjacent its free end.

2. A welding apparatus comprising, in combination, a rail, a carriage on said rail, a guide rail, means on the carriage engaging the guide rail, means for moving the carriage longitudinally of the rail, a pair of screws extending vertically from the carriage, a cage extending laterally of the carriage, nuts secured to the carriage and engaging said screws, means for rotating said screws, vertical guides for the cage, a slide mounted beneath the cage, a screw, a nut secured to the slide and engaged with the screw, an arm secured to the slide and extending laterally of the cage in parallelism with the rail and a welding head mounted on the arm adjacent its free end.

3. A welding apparatus comprising, in combination, a rail, a carriage on said rail, a guide rail, means on the carriage engaging the guide rail, means for moving the carriage longitudinally of the rail, a pair of screws extending vertically from the carriage, a cage extending laterally of the carriage, nuts secured to the carriage and engaging said screws, means for rotating said screws, vertical guides for the cage, an arm secured at one end to the cage and extending laterally thereof in parallelism with said rail, a longitudinally movable carriage supported from said arm adjacent its free end, a welding head secured to said carriage on a vertical pivot, means for locking said carriage against movement, means for locking the welding head against movement about said vertical pivot, a guide wheel pivotally associated with the welding head and means for locking said wheel in any one of four positions 90° apart.

4. A welding apparatus comprising, in combination, a rail, a carriage on said rail, a guide rail, means on the carriage engaging the guide rail, means for moving the carriage longitudinally of the rail, a pair of screws extending vertically from the carriage, a cage extending laterally of the carriage, nuts secured to the carriage and engaging said screws, means for rotating said screws, vertical guide for the cage, a slide mounted beneath the cage, a screw, a nut secured to the slide and engaging with the screw, an arm secured at one end to the slide and extending laterally of the cage in parallelism with the rail, a longitudinally movable carriage supported from said arm adjacent its free end, a welding head secured to said carriage on a vertical pivot, means for locking said carriage against movement, means for locking the welding head against movement about said vertical pivot, a guide wheel pivotally associated with the welding head, and means for locking said wheel in any one of four positions 90° apart.

5. A welding apparatus comprising, in combination, a support, means for moving the support longitudinally, means for raising and lowering the support vertically with respect to its longitudinal movement, an arm secured to and extending in the direction of longitudinal movement of the support, a welding head supported from said arm adjacent its free end for movement longitudinally with respect to said arm and for pivotal movement on an axis extending vertically with respect to the longitudinal extension of said arm, releasable means for preventing longitudinal movement of the head and releasable means for preventing pivotal movement of the head.

6. A welding apparatus comprising, in combination, a support, means for moving the support longitudinally, means for raising and lowering the support vertically with respect to its longitudinal movement, an arm secured to and extending in the direction of longitudinal movement of the support, a welding head supported from said arm on a vertical pivot and means for locking the welding head against movement with respect to said pivot.

7. A welding apparatus comprising, in combination, a longitudinally movable carriage, a support extending from the carriage laterally of its direction of movement, means for raising and lowering the support vertically with respect to the direction of movement of the carriage, an arm secured to said support adjacent one of its ends and extending in parallelism with the direction of movement of the carriage and a welding head supported from said arm adjacent its free end for movement in a longitudinal direction with respect to said arm and for pivotal movement about an axis extending vertically with respect to said arm, releasable means for preventing longitudinal movement of said head and releasable means for preventing pivotal movement of said head.

8. A welding apparatus comprising, in combination, a rail, a carriage on said rail, a guide rail, means on the carriage engaging the guide rail, means for moving the carriage longitudinally of the rail, a cage extending laterally of the carriage, means for raising and lowering the cage vertically with respect to the direction of movement of the carriage, a welding head carried by the cage, a rotatable support carried by the cage above the welding head and means carried by the rotatable support for the supply of welding rod and melt to the welding head.

9. A welding apparatus comprising, in combination, a rail, a carriage on said rail, a guide rail, means on the carriage engaging the guide rail, means for moving the carriage longitudinally of the rail, a cage extending laterally of the carriage, means for raising and lowering the cage vertically with respect to the direction of movement of the carriage, a welding head carried by the cage, an arm secured at one end to the cage and extending in parallelism to the direction of movement of the carriage, a second welding head supported on said arm adjacent its free end, a rotatable support carried by the cage above the welding head and means carried by the rotatable support for the supply of welding rod and melt to one of the welding heads.

10. A welding apparatus comprising, in combination, a rail, a carriage on said rail, a guide rail, means on the carriage engaging the guide rail, means for moving the carriage longitudinally of the rail, a cage extending laterally of the carriage, means for raising and lowering the cage vertically with respect to the direction of movement of the carriage, vertical guides for the cage, a slide mounted beneath the cage, a screw, a nut secured to the slide and engaged with the screw, an arm secured to the slide and extending laterally of the cage in parallelism with the rail and a welding head mounted on the arm adjacent its free end.

11. A welding apparatus comprising, in combination, a rail, a carriage on said rail, a guide rail, means on the carriage engaging the guide rail, means for moving the carriage longitudinally of the rail, a cage extending laterally of the carriage, means for raising and lowering the cage vertically with respect to the direction of movement of the carriage, vertical guides for the cage, an arm secured at one end to the cage and extending laterally thereof in parallelism with said rail, a longitudinally movable carriage supported from said arm adjacent its free end, a welding head secured to said carriage on a vertical pivot, means for locking said carriage against longitudinal movement and means for locking the welding head against movement about said vertical pivot.

12. A welding apparatus comprising, in combination, a rail, a carriage on said rail, a guide rail, means on the carriage engaging the guide rail, means for moving the carriage longitudinally of the rail, a cage extending laterally of the carriage, means for raising and lowering the cage vertically with respect to the direction of movement of the carriage, vertical guides for the cage, a slide mounted beneath the cage, a screw, a nut secured to the slide and engaging with the screw, an arm secured at one end to the slide and extending laterally of the cage in parallelism with the rail, a longitudinally movable carriage supported from said arm adjacent its free end, a welding head secured to said carriage on a vertical pivot, means for locking said carriage against longitudinal movement, and means for locking the welding head against movement about said vertical pivot.

13. A welding apparatus comprising, in combination, a rail, a carriage on said rail, a guide rail positioned above the first mentioned rail, means supported from the carriage and engaging the guide rail, an arm extending from said carriage, a welding head supported from said arm, a guide wheel pivotally associated with said welding head and means for locking said wheel in any one of a plurality of positions about its pivot.

14. A welding apparatus comprising, in combination, a rail, a carriage on said rail, a guide rail, means on the carriage engaging the guide rail, a support extending laterally of the carriage, a welding head carried by the support, a rotatable support carried by the support above the welding head and means carried by the rotatable support for the supply of welding rod and melt to the welding head.

15. A welding apparatus comprising, in combination, a rail, a carriage on said rail, means for moving the carriage longitudinally of the rail, a support extending laterally of the carriage, means for raising and lowering the support vertically with respect to the direction of movement of the carriage, a slide supported from the support, means for moving the slide relative to the support, an arm secured to the slide and extending therefrom in parallelism with the direction of movement of the carriage, and a welding head mounted on the arm adjacent its free end.

16. A welding apparatus comprising, in combination, a rail, a carriage on said rail, an arm extending from said carriage in a direction longitudinally of the rail, a welding head supported from said arm for longitudinal and pivotal movement and a guide wheel pivotally associated with said welding head and means for locking said wheel in any one of a plurality of positions about its pivot.

CECIL D. HOWARD.